Dec. 9, 1969   G. NIADA   3,482,828
HYDRAULIC SHOCK ABSORBER FOR PICKING STICKS OF LOOMS
Filed March 31, 1967
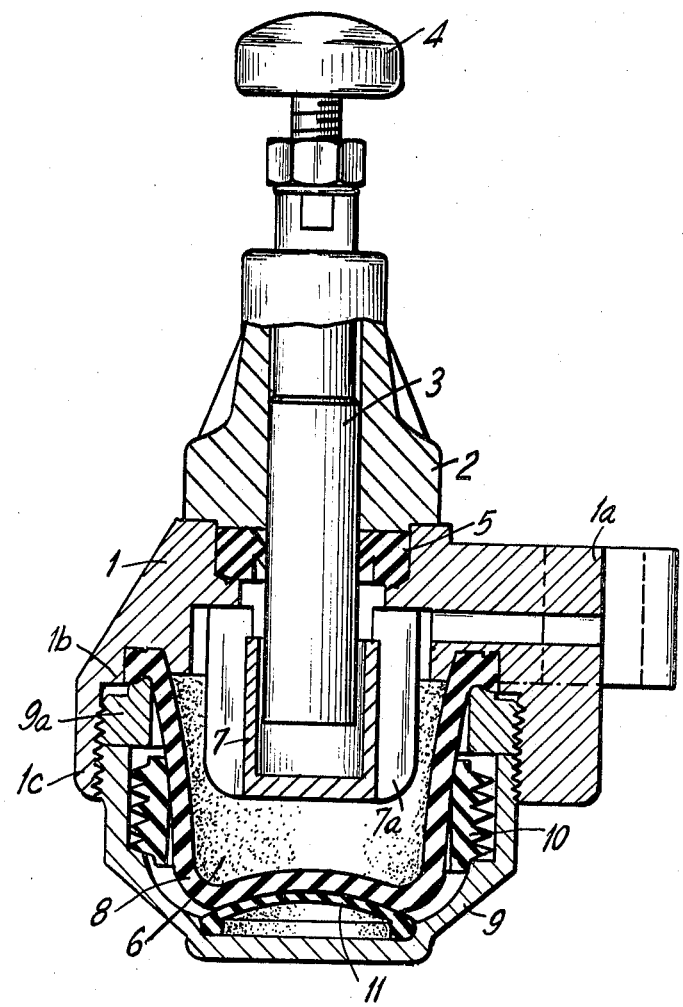
INVENTOR.
GIORGIO NIADA
BY
*McGlew & Toren*
ATTORNEYS

United States Patent Office 3,482,828
Patented Dec. 9, 1969

---

3,482,828
HYDRAULIC SHOCK ABSORBER FOR PICKING STICKS OF LOOMS
Giorgio Niada, Via Sismondi 62, Milan, Italy
Filed Mar. 31, 1967, Ser. No. 627,375
Int. Cl. F16f 1/44; D03d 49/38
U.S. Cl. 267—1             7 Claims

ABSTRACT OF THE DISCLOSURE

A shock absorber, for hydraulic braking of the picking stick of a loom, includes a ram or plunger having a striking or impact head engageable by the picking stick, and this plunger is reciprocable in a displacement chamber built into an oil chamber casing. A cup-shaped membrane is mounted in the casing and forms the major portion of the limiting walls thereof.

The membrane is flexible and is movable within certain limits. A control member in the form of an adjustable cap cooperates with the membrane, there being a ribbed clamping ring interposed laterally between the membrane and the adjustable cap. The end wall of the cap also includes a dished pressure disk having a convex surface engaged with the end wall of the membrane, this pressure disk being elastic in order to provide for some movement of the end wall of the membrane.

BACKGROUND OF THE INVENTION

The present invention is directed to shock absorbers for braking of the picking stick of a loom and, more particularly, to a novel hydraulic shock absorber for braking picking sticks of looms and which has a simple and compact construction requiring only a relatively small volume of hydraulic fluid.

In known constructions of this kind, such as shown, for example, in Italian Patent No. 659,263, the membrane is essentially a plane disk which, due to the oil pressure in an oil chamber, is easily bent or arched in an outward direction. This disk bears against a helical spring whose counter pressure or bias is determined or adjusted by means of a control cap.

The control range, using such a plane membrane disk, is very small due to the small bending capability of the membrane. Additionally, and in order to assure that the counter pressure or bias of the helical spring acts uniformly and concentrically on the membrane, there must be provided, between the membrane and the spring, an additional rigid pressure plate or spring seat.

SUMMARY OF THE INVENTION

The present invention is directed to a hydraulic shock absorber for braking picking sticks of looms and which is free of the disadvantages of known shock absorbers used for this purpose. In accordance with the present invention, a displacement chamber is situated coaxially in the oil chamber of a casing, and a cup or cap-shaped membrane embraces the displacement chamber coaxially and forms a larger portion of the boundary walls of the oil chamber. A control cap, which is threaded into the casing and which coaxially surrounds the membrane, presses against the end wall of the membrane cap through the medium of a dished elastic pressure plate having a convex surface engaging the end wall of the membrane.

Besides the simple construction which is obtained due to the coaxial arrangement of the plunger, the displacement chamber, the membrane cap and the control cap, the cap-shaped membrane has the advantage that it is more extendable than a disk-shaped membrane. Consequently, a special counter pressure or counter bias spring, seated between the membrane and the control cap, is unnecessary. Additionally, a significantly larger control range is obtainable.

Accordingly, an object of the present invention is to provide an improved hydraulic shock absorber for braking picking sticks of looms.

Another object of the invention is to provide such a hydraulic shock absorber for braking picking sticks of looms and including a series of coaxially arranged elements resulting in a very compact construction requiring only a small volume of hydraulic fluid.

A further object of the invention is to provide such a hydraulic shock absorber for braking picking sticks of looms and including a cup or cap-shaped membrane arranged coaxially in an oil chamber, and defining the major portion of the boundary walls of the latter, and which membrane is coaxial with the displacement chamber in the oil chamber and in which latter an impact receiving plunger is coaxially displaceable.

Still another object of the invention is to provide a hydraulic shock absorber, of the type just mentioned, including a control cap threaded into the oil chamber and coaxial with the membrane, this control cap carrying a disk-shaped pressure disk having a concave surface engaging the outer surface of the end wall of the membrane.

A further object of the invention is to provide a hydraulic shock absorber for braking picking sticks of looms, as just described, including a ribbed clamping ring interposed between a peripheral wall of the control cap and a peripheral wall of the membrane.

BRIEF DESCRIPTION OF THE DRAWINGS

For an understanding of the principles of the invention, reference is made to the following description of a typical embodiment thereof as illustrated in the accompanying drawing.

In the drawings:

The single figure is an axial sectional view through a hydraulic shock absorber, for braking picking sticks of looms, and embodying the invention.

DESCRIPTION OF THE PREFERRED EMBODIMENT

Referring to the drawing, the hydraulic shock absorber for braking picking sticks of looms comprises a metal casing 1 which, by means of a projection 1a, can be fixedly mounted below the sley of the loom. A guide member 2, for a plunger 3, is mounted on casing 1 substantially coaxially of the latter. That portion of plunger 3 which projects from guide member 2 carries an abutment or impact head 4 against which, during operation of the loom, the picking stick of the loom strikes.

Leakage of fluid outwardly of plunger 3 is prevented by a seal 5 held in place in a suitable recess in casing 1 by guide member 2, this seal having a flexible lip closely embracing plunger 3. The inner end of plunger 3 extends into oil chamber 6 and is reciprocable, with clearance, in a displacement chamber 7 mounted, through the medium of radial webs 7a, from the inner wall of casing 1.

A cup-shaped membrane cap 8 is arranged coaxially of plunger 3 and displacement chamber 7, this cap forming the major portion of the peripheral walls of oil chamber 6. Membrane cap 8 is formed of elastic material, such as rubber, and has a marginal bead fixed in a groove of a shoulder 1b of casing 1. The holding ring 9a is threadedly engaged in the internal thread of a peripheral lip or flange 1c of casing 1, and which embraces shoulder 1b.

A regulating cap 9 is also threaded into flange 1c, and this cap is in embracing but radially spaced relation with membrane cap 8. Between the inner circumferential wall of regulating cap 9 and the outer circumferential wall of membrane cap 8, there is arranged an outwardly ribbed compressible clamping ring 10 which seats on an inwardly facing shoulder in cap 9. The end wall of cap 9 is formed with a circular recess seating an elastic dished pressure disk 11 having a convex outer surface engaging the end wall of membrane cap 8.

As will be apparent from the drawing, plunger 3, displacement chamber 7, oil chamber 6, membrane cap 8 and control cap 9 are arranged coaxially with each other. Displacement chamber 7 is situated within oil chamber 6, the major portion of whose peripheral wall surface is limited by membrane cap 8. This results not only in a simple and compact construction, but also results in a relatively small requisite oil volume. The effective oil volume of displacement chamber 7, while less than the volume of oil chamber 6, is large as compared to known prior constructions in which, for example, the ratio of the two volumes may be 8:1, as compared to the approximately 3:1 ratio of the invention arrangement. On the other hand, the inner surface of membrane cap 8, which is subjected to the oil pressure, is also large, whereby the yieldability of the membrane cap is correspondingly large.

Clamping ring 10 prevents membrane cap expanding too greatly in a radial direction, without decreasing its expansibility in an axial direction. By screwing in control cap 9 to a greater or lesser extent, the axial deformability of membrane cap 8, and thus the braking characteristic of the shock absorber, may be adjusted.

Insofar as the shock absorbing action is concerned, the invention arrangement operates in essentially the same manner as do known prior art arrangements, namely by displacement of oil from chamber 7 into chamber 6, defined by membrane 8, and vice versa. It will be appreciated that, as the chamber 7 is mounted within the chamber 6 and communicates therewith, the chamber 7 being fixedly mounted on the metal casing 1 through the ribs 7a, there is oil present both in the chamber 7 and in the chamber 6. Intercommunication is facilitated by the radial clearance between plunger 3 and the inner cylindrical surface of chamber 7.

The main portion of the peripheral wall of oil chamber 6 is formed by the elastic cap 8. If plunger 3 is free, elastic cap 8 tends to reduce the volume of oil chamber 6 and thus force oil, through the clearance between plunger 3 and the inner cylindrical surface of displacement chamber 7, into the displacement chamber. Thus, plunger 3 is forced outwardly into its outermost position. If now head 4 of plunger 3 is struck by the picking stick of the loom, plunger 3 is forced axially inwardly so that oil from displacement chamber 7 is displaced or forced out of this chamber, through the clearance between plunger 3 and the inner cylindrical surface of chamber 7, into the oil chamber 6, which latter thus has to be enlarged in volume. Such enlargement of chamber 6 is possible due to the elasticity of cap 8. However, since cap 8 is embraced by the rigid regulating cap 9, the speed of enlargement of chamber 8, and thus an oil flow out of displacement chamber 7, depends on the axial position of cap 9. In accordance with the axial position of cap 9, the elements 11 and 10 produce a greater or a less elastic force resisting enlargement of cap 8. This type of operation of a shock absorber for braking of the picking stick of a loom is fully described not only in Italian Patent No. 659,263, mentioned on page 2 of the specification, but also, for example, in Leader et al. U.S. Patent No. 3,180,369. It should be emphasized that, in the present invention, the displacement chamber 7 is mounted on the metal casing 1 through the medium of the rib 7a, and thus is fixed in position and not axially displaceable.

What is claimed is:
1. A hydraulic shock absorber for braking reciprocable members of looms, such as picking sticks, comprising, in combination, a reciprocable plunger having an impact head; means mounting said plunger for reciprocation; a displacement chamber forming part of an oil chamber housing, said plunger extending movably into said displacement chamber; a cap-shaped membrane mounted in said housing and forming a wall of the oil chamber, said membrane being flexible and having a wall which has a limited movement; a regulating cap cooperating with said cap-shaped membrane; said displacement chamber being arranged coaxially in said oil chamber and said cap-shaped membrane coaxially embracing, in radially spaced relation, said displacement chamber and forming the larger portion of the oil chamber boundary wall; said regulating cap being coaxial with said oil chamber and with said displacement chamber, and coaxially surrounding said cap-shaped membrane; said regulating cap being displaceable axially to regulate the extension of said cap-shaped membrane; and an elastic pressure plate engaging an end wall of said regulating cap and bearing against the end wall of said cap-shaped membrane.

2. A hydraulic shock absorber, as claimed in claim 1, in which said regulating cap is threaded into the oil chamber housing.

3. A hydraulic shock absorber, as claimed in claim 2, in which said regulating cap has a circumferential wall embracing a circumferential wall of said cap-shaped membrane in radially spaced relation to the latter; and a compressible ribbed clamping ring disposed between said circumferential walls.

4. A hydraulic shock absorber, as claimed in claim 2, in which said elastic pressure plate is dished and has a convex surface bearing against the end wall of said cap-shaped membrane.

5. A hydraulic shock absorber, as claimed in claim 3, in which said ribbed clamping ring is seated on an inwardly facing shoulder within said regulating cap.

6. A hydraulic shock absorber, as claimed in claim 2, including radial webs mounting said displacement chamber within said oil chamber housing.

7. A hydraulic shock absorber, as claimed in claim 2, in which said means reciprocably mounted said plunger comprises a plunger guide mounted on said housing; and a seal preventing leakage of fluid around said plunger; said seal being seated in a recess in said casing and retained in position by said plunger guide.

References Cited

UNITED STATES PATENTS

| 2,354,340 | 7/1944 | Utter | 188—97 |
| 2,856,035 | 10/1958 | Rohacs. | |
| 2,873,963 | 2/1959 | Taylor | 267—64 |
| 3,180,369 | 4/1965 | Leader et al. | |

FOREIGN PATENTS 1,031,889   6/1966   Great Britain.

ARTHUR L. LA POINT, Primary Examiner

CHARLES R. LYON, Assistant Examiner

U.S. Cl. X.R.

139—161; 267—64